US012802698B2

(12) United States Patent
Yang

(10) Patent No.: US 12,802,698 B2
(45) Date of Patent: Nov. 17, 2026

(54) METHOD AND APPARATUS FOR TRAINING SPEECH CONVERSION MODEL, DEVICE, AND MEDIUM

(71) Applicant: Tencent Technology (Shenzhen) Company Limited, Shenzhen (CN)

(72) Inventor: Peiji Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 131 days.

(21) Appl. No.: 18/885,324

(22) Filed: Sep. 13, 2024

(65) Prior Publication Data

US 2025/0006212 A1 Jan. 2, 2025

Related U.S. Application Data

(63) Continuation of application No. PCT/CN2023/124162, filed on Oct. 12, 2023.

(30) Foreign Application Priority Data

Nov. 21, 2022 (CN) ........................ 202211455842.7

(51) Int. Cl.
*G10L 21/007* (2013.01)
*G10L 15/02* (2006.01)
*G10L 15/06* (2013.01)

(52) U.S. Cl.
CPC ............ *G10L 21/007* (2013.01); *G10L 15/02* (2013.01); *G10L 15/063* (2013.01)

(58) Field of Classification Search
CPC .......... G06N 3/02; G06N 3/0475; G06N 3/08; G06N 20/20; G06N 3/045; G06N 3/048;
(Continued)

(56) References Cited

U.S. PATENT DOCUMENTS 10,476,872 B2 * 11/2019 McLaren ................ G10L 15/22
10,847,251 B2 * 11/2020 van Rooyen .......... G16B 30/00
(Continued)

FOREIGN PATENT DOCUMENTS

CN 110085244 A 8/2019
CN 112767912 A 5/2021
(Continued)

OTHER PUBLICATIONS

Tencent Technology, ISR, PCT/CN2023/124162, Jan. 29, 2024, 3 pgs.

(Continued)

*Primary Examiner* — Gerald Gauthier
(74) *Attorney, Agent, or Firm* — Morgan, Lewis & Bockius LLP

(57) ABSTRACT

This application discloses a speech conversion method performed by a computer device. The method includes: obtaining first accent audio corresponding to a first accent; extracting a first content feature from the first accent audio through the first ASR model, the first content feature being corresponding to the first accent; converting the first content feature into a second content feature through the second conversion model, the second content feature being corresponding to a second accent; and performing audio conversion on the second content feature through the third conversion model to obtain second accent audio.

20 Claims, 7 Drawing Sheets

(58) Field of Classification Search
CPC ......... G10L 13/02; G10L 13/08; G10L 13/10; G10L 15/02; G10L 15/063; G10L 15/065; G10L 15/26; G10L 19/16; G10L 21/003; G10L 21/007; G10L 25/24; G10L 2021/0135; G10L 13/047; G10L 15/22; H04M 1/72433; Y02T 10/40; G16B 50/00; G16B 30/00
See application file for complete search history.

(56) References Cited

U.S. PATENT DOCUMENTS

| | | | | |
|---|---|---|---|---|
| 11,687,778 | B2 * | 6/2023 | Ciftci | G06N 3/048 382/115 |
| 11,842,796 | B2 * | 12/2023 | van Rooyen | G16B 50/00 |
| 2012/0022869 | A1 * | 1/2012 | Lloyd | G10L 15/065 704/E15.001 |
| 2016/0064033 | A1 | 3/2016 | Koul et al. | |
| 2022/0358903 | A1 * | 11/2022 | Serebryakov | G10L 13/02 |
| 2022/0382998 | A1 | 12/2022 | Tang | |
| 2023/0223006 | A1 * | 7/2023 | Fan | H04M 1/72433 704/231 |
| 2023/0260502 | A1 * | 8/2023 | Gabrys | G06N 3/045 704/260 |
| 2023/0352001 | A1 * | 11/2023 | Carmiel | G10L 13/10 |
| 2023/0360632 | A1 * | 11/2023 | Biadsy | G10L 13/08 |
| 2024/0098218 | A1 * | 3/2024 | Nguyen | G10L 15/063 |
| 2024/0386875 | A1 * | 11/2024 | Serebryakov | G10L 13/02 |
| 2024/0404505 | A1 * | 12/2024 | Nguyen | G10L 13/047 |
| 2025/0006212 | A1 * | 1/2025 | Yang | G10L 21/003 |
| 2025/0191573 | A1 * | 6/2025 | Lajszczak | G10L 15/02 |
| 2026/0080857 | A1 * | 3/2026 | Serebryakov | G10L 13/02 |

FOREIGN PATENT DOCUMENTS

| | | | |
|---|---|---|---|
| CN | 113223542 | A | 8/2021 |
| CN | 113450759 | A | 9/2021 |
| CN | 113838448 | A | 12/2021 |
| CN | 114038484 | A | 2/2022 |

OTHER PUBLICATIONS

Yongmao Zhang et al., "AccentSpeech: Learning Accent from Crowd-Sourced Data for Target Speaker TTS with Accents", 13th International Symposium on Chinese Spoken Language Processing (ISCSLP), DOI: 10.1109/ISCSLP57327.2022.10037914, Oct. 2022, 5 pgs.

* cited by examiner

METHOD AND APPARATUS FOR TRAINING SPEECH CONVERSION MODEL, DEVICE, AND MEDIUM

CROSS-REFERENCE TO RELATED APPLICATIONS

This application is a continuation application of PCT Patent Application No. PCT/CN2023/124162, entitled "METHOD AND APPARATUS FOR TRAINING SPEECH CONVERSION MODEL, DEVICE, AND MEDIUM" filed on Oct. 12, 2023, which claims priority to Chinese Patent Application No. 202211455842.7, entitled "METHOD AND APPARATUS FOR TRAINING SPEECH CONVERSION MODEL, DEVICE, AND MEDIUM" filed on Nov. 21, 2022, both of which are incorporated herein by reference in their entirety.

FIELD OF THE TECHNOLOGY

Embodiments of this application relate to the field of audio processing technologies, and in particular, to a method and an apparatus for training a speech conversion model, a device, a medium.

BACKGROUND OF THE DISCLOSURE

With the continuous development of network technologies, more users are beginning to use virtual images for livestreaming, games, social networking, or online meetings on the Internet.

To protect personal privacy and security, the user may set an accent for the virtual image during use of the virtual image. In this way, a user speech of an original accent is converted into the set accent and then played, and it is ensured that content of the user speech remains unchanged. In the related art, accent conversion is usually implemented by using a speech conversion model, and a large quantity of parallel corpora are required in a process of training the speech conversion model. The parallel corpora are different accent audio of the same speech content.

However, the parallel corpora usually need to be manually recorded, resulting in high difficulty in obtaining the parallel corpora. When the parallel corpora are insufficient, quality of the speech conversion model obtained through training is poor, thus affecting an accent conversion effect.

SUMMARY

Embodiments of this application provide a method and an apparatus for training a speech conversion model, a device, and a medium, which can ensure training quality of the speech conversion model while reducing a need for manually recorded parallel corpora. The technical solutions are as follows:

According to one aspect, an embodiment of this application provides a speech conversion method performed by a computer device, the computer device having a speech conversion model provided therein, the speech conversion model including a first ASR model, a second conversion model, and a third conversion model, and the method including:

- obtaining first accent audio corresponding to a first accent;
- extracting a first content feature from the first accent audio through the first ASR model, the first content feature being corresponding to the first accent;
- converting the first content feature into a second content feature through the second conversion model, the second content feature being corresponding to a second accent; and
- performing audio conversion on the second content feature through the third conversion model to obtain second accent audio.

According to another aspect, an embodiment of this application provides a computer device, including a processor and a memory, the memory storing at least one instruction, the at least one instruction being loaded and executed by the processor to implement the speech conversion method described in the foregoing aspects.

According to another aspect, an embodiment of this application provides a non-transitory computer-readable storage medium, the readable storage medium storing at least one instruction, the at least one instruction being loaded and executed by a processor of a computer device and causing the computer device to implement the speech conversion method described in the foregoing aspects.

In the embodiments of this application, in a case of lack of a parallel corpus corresponding to a second sample audio of a second accent, a first conversion model configured for converting a text into a content feature is first trained based on first sample audio of a first accent. In this way, parallel sample data corresponding to the same text content but corresponding to different accents is constructed by using the first conversion model and a second sample text corresponding to the second sample audio. Then, a second conversion model for content feature conversion between different accents and a third conversion model configured for converting the content feature into audio are trained by using the parallel sample data, to complete training of a speech conversion model. During the model training, parallel corpora are constructed by using an intermediate model obtained through training, and there is no need to record parallel corpora of different accents before the model training. This can reduce a demand from model training for manually recorded parallel corpora while ensuring the quality of model training, thereby helping improve the efficiency of model training and improve the quality of model training in a case of insufficient samples.

DESCRIPTION OF EMBODIMENTS

To reduce dependence of a model training process on prerecorded parallel corpora, in the embodiments of this application, a speech conversion model is composed of a first ASR model (configured for converting audio into a text), a second conversion model (configured for content feature conversion between different accents), and a third conversion model (configured for converting a content feature into audio). In addition, in a training process, after training of the first ASR model is completed, a first conversion model for converting a text into a content feature is trained. In this way, parallel sample data is constructed by means of the first conversion model, for subsequent training of the second conversion model and the third conversion model. In the training process, parallel corpora are constructed by means of the conversion models obtained through training, and there is no need to manually record a large quantity of parallel corpora in advance, thereby reducing the dependence of the training process on the parallel corpora and ensuring the quality of model training.

Information (including but not limited to user equipment information, user personal information, and the like), data (including but not limited to data for analysis, stored data, displayed data, and the like), and signals involved in this application are all authorized by users or fully authorized by all parties, and collection, use, and processing of relevant data need to comply with relevant laws, regulations, and standards of relevant countries and regions. For example, audio, accents, and texts involved in this application are all obtained with full authorization.

Figure 1:
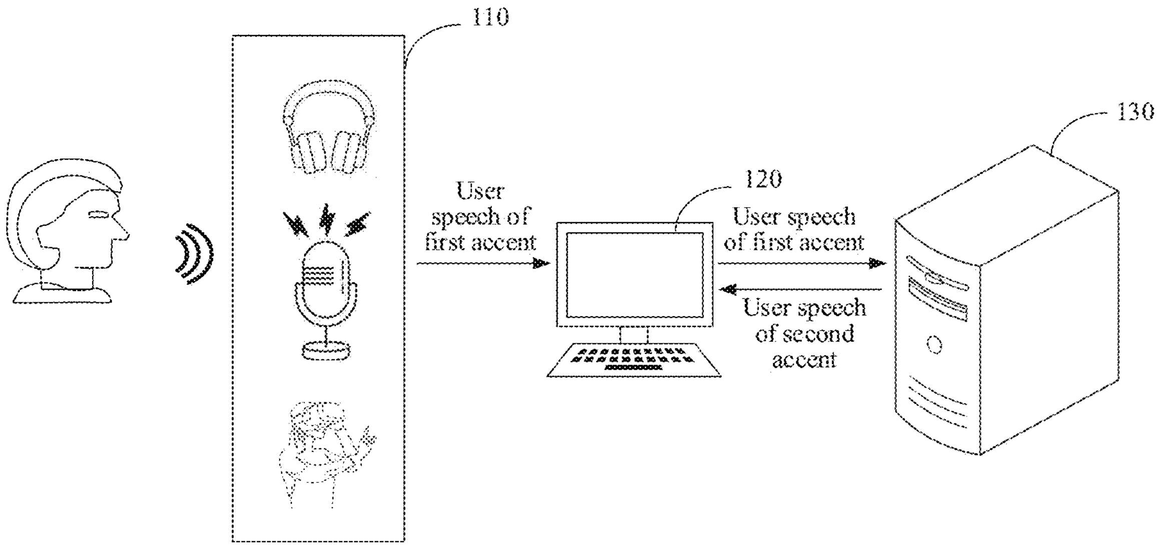
FIG. 1 is a schematic diagram of a speech conversion system according to an exemplary embodiment of this application.

A speech conversion model obtained through training by using a training method provided in the embodiments of this application can be applied to various scenarios in which accent conversion is required. FIG. 1 is a schematic diagram of a speech conversion system according to an exemplary embodiment of this application. The speech conversion system includes an audio acquisition device 110, a terminal 120, and a server 130.

The audio acquisition device 110 is a device configured to acquire a user speech. The audio acquisition device 110 may be a headset, a microphone, an augmented reality (AR)/virtual reality (VR) device having a sound recording function, or the like. This is not limited in the embodiments of this application.

The audio acquisition device 110 is connected to the terminal 120 in a wired or wireless manner, and is configured to transmit the acquired user speech to the terminal 120. The terminal 120 further performs accent conversion processing on the user speech. The terminal 120 may be an electronic device such as a smartphone, a tablet computer, a personal computer, or an in-vehicle terminal.

In some embodiments, an application (APP) having an accent conversion function is provided in the terminal 120. Through this APP, a user may set an accent conversion target, to convert a user speech from an original speech to a target speech.

In a possible implementation, the accent conversion may be implemented locally by the terminal 120 (a speech conversion model is provided in the terminal 120). In another possible implementation, the accent conversion may be implemented by the terminal 120 by means of the server 130 (a speech conversion model is provided in the server 130, and the terminal 120 transmits an accent conversion requirement to the server 130).

The server 130 may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence (AI) platform. In this embodiment of this application, the server 130 may be a backend server that implements an accent conversion function, and is configured to provide a conversion service between different accents.

In some embodiments, a plurality of speech conversion models are provided in the server 130, and different speech conversion models are configured for implementing conversion between different accents. For example, when conversion of Mandarin into n local accents is supported, n speech conversion models are provided in the server 130.

In addition, before the accent conversion function is implemented, the server 130 obtains accent corpora of different accents. The accent corpora include audio and corresponding texts, so that the corresponding speech conversion models are trained based on the accent corpora.

As shown in FIG. 1, before accent conversion is performed, a user sets, through the terminal 120, a first accent to be converted into a second accent. The terminal 120 transmits an accent conversion request to the server 130, to request the server 130 to perform accent conversion (convert the first accent into the second accent) by using a corresponding speech conversion model.

The audio acquisition device 110 transmits an acquired user speech of the first accent to the terminal 120, and the terminal 120 transmits the user speech of the first accent to the server 130. The server 130 converts the user speech into a user speech of the second accent through the speech conversion model, and feeds back the user speech of the second accent to the terminal 120 for further processing by the terminal 120.

In different application scenarios, the terminal 120 processes a user speech in different manners. The following uses a centralized exemplary application scenario for description.

1. Virtual Human Content Production Scenario

In a virtual human content production scenario, after obtaining a user speech obtained through conversion, the terminal fuses the user speech with produced content (for example, a short video of a virtual human or a long video of a virtual human) to obtain virtual human content. During the fusion, a mouth of the virtual human may be controlled according to the user speech obtained through conversion, to improve a matching degree between a mouth movement of the virtual human and the speech.

For example, in a virtual human content production scenario, in an example of producing a short video of a virtual human, the terminal obtains first accent audio corresponding to a real user, the first accent audio being corresponding to a first accent of the real user, and the terminal extracts a first content feature at the first accent from the first accent audio through a first ASR model in a speech conversion model. The terminal converts the first content feature into a second content feature through a second conversion model in the speech conversion model, the second content feature being corresponding to a second accent. After accent conversion is completed, the terminal performs audio conversion on the second content feature at the second accent through a third conversion model in the speech conversion model to obtain second accent audio corresponding to the virtual human.

2. Virtual Anchor Livestreaming Scenario

In a virtual anchor livestreaming scenario, a virtual anchor may preset a livestreaming accent through an accent setting interface. During livestreaming, the terminal transmits a user speech acquired through a microphone to the server, and the server converts the user speech of an original accent into a user speech of the livestreaming accent, and feeds back the user speech of the livestreaming accent to the terminal. The terminal merges the user speech of the livestreaming accent with a video stream including an image of the virtual anchor, so that a streaming server pushes an audio/video stream obtained through the merging to each viewer client in a livestreaming room.

For example, in a virtual anchor livestreaming scenario, a livestreaming accent of a virtual anchor may be preset. The terminal acquires first accent audio corresponding to a real user through a microphone, the first accent audio being corresponding to a first accent of the real user, and the terminal extracts a first content feature at the first accent from the first accent audio through a first ASR model in a speech conversion model. The terminal converts the first content feature into a second content feature through a second conversion model in the speech conversion model, the second content feature being corresponding to a second accent. After accent conversion is completed, the terminal performs audio conversion on the second content feature at the second accent through a third conversion model in the speech conversion model to obtain second accent audio corresponding to the virtual anchor. That is, the virtual anchor performs live streaming with the second accent audio.

3. Metaverse Scenario

In a metaverse scenario, a user may set an accent for interaction in the metaverse. When the user controls a virtual character to interact with another virtual character in the metaverse, a user speech is acquired by a device such as a headset or AR/VR and transmitted to a terminal. The terminal further transmits the user speech to a server for accent conversion, and controls the virtual character to play accent audio obtained through conversion in the metaverse, to implement voice interaction with the another virtual character.

For example, in the metaverse scenario, a second accent for interaction with another virtual character may be selected in advance. During the interaction, the terminal acquires first accent audio corresponding to a real user through a microphone, the first accent audio being corresponding to a first accent of the real user, and the terminal extracts a first content feature at the first accent from the first accent audio through a first ASR model in a speech conversion model. The terminal converts the first content feature into a second content feature through a second conversion model in the speech conversion model, the second content feature being corresponding to a second accent. After accent conversion is completed, the terminal performs audio conversion on the second content feature at the second accent through a third conversion model in the speech conversion model to obtain second accent audio corresponding to the virtual character in the metaverse, that is, the virtual character in the metaverse interacts with the another virtual character with the second accent audio.

The foregoing application scenarios are merely exemplary descriptions. The speech conversion model obtained through training by using the method provided in the embodiments of this application may alternatively be used in real-world application scenarios such as voice calls (to facilitate voice communication between callers with different accents) and translations. This is not limited in the embodiments of this application.

In addition, for ease of description, in the following embodiments, descriptions are provided by using an example in which training and use of a speech conversion model are both used in a computer device (which may be a terminal or a server) and a speech conversion model configured for converting a first accent into a second accent is to be trained (other solutions for converting a source speech into a target speech are similar). However, this is not limited.

Figure 2:
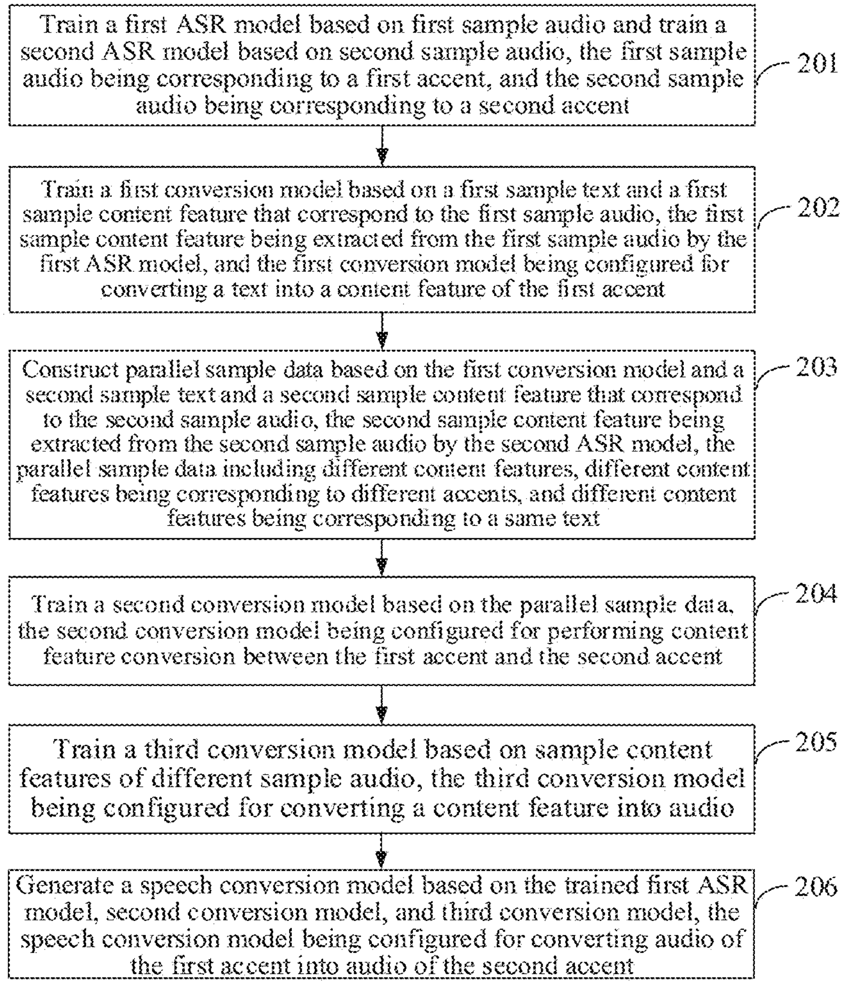
FIG. 2 is a flowchart of a method for training a speech conversion model according to an exemplary embodiment of this application.

FIG. 2 is a flowchart of a method for training a speech conversion model according to an exemplary embodiment of this application. The method is performed by a computer device. The method includes the following operations.

Operation 201: Train a first ASR model based on first sample audio and train a second ASR model based on second sample audio, the first sample audio being corresponding to a first accent, and the second sample audio being corresponding to a second accent.

The first accent is a source accent, and the second accent is a target speech, that is, a speech conversion model obtained through training is configured for converting a speech of the first accent into a speech of the second accent.

In some embodiments, the first sample audio corresponds to a first sample text, and the second sample audio corresponds to a second sample text. In this embodiment of this application, the first sample text does not need to be the same as the second sample text. Therefore, a public speech dataset may be directly used for model training.

In an illustrative example, the computer device uses a Wenet Speech dataset as the first sample audio, and uses a KeSpeech dataset as the second sample audio. The Wenet Speech dataset includes ten thousand hours of ASR data. For an introduction, refer to the website: https://zhuanlan.zhihu.com/p/424118791. The KeSpeech dataset includes ASR data of different regional dialects. For an introduction, refer to the website: https://datasets-benchmarks-proceedings- .neurips.cc/paper/2021/hash/0336dcbab05b9d5ad24f4333c7658a0e-Abstract-round2.html.

Regarding a training manner of the ASR model, in a possible implementation, the computer device inputs sample audio to the ASR model to obtain a predicted text outputted by the ASR model, so that the ASR model is trained based on the predicted text and a sample text corresponding to the sample audio.

In some embodiments, a model architecture of the ASR model includes but is not limited to Wenet, Wav2Vec2, Kaldi, and the like. This is not limited in the embodiments of this application. Wenet is a speech recognition toolkit that is used for industrial applications open-sourced by the Mobvoi voice team in collaboration with the Speech Laboratory of Northwestern Polytechnical University. This tool provides a one-stop service from training to deployment of speech recognition with a concise solution. For an introduction, refer to the website: https://zhuanlan.zhihu.com/p/349586567. Wav2Vec is proposed in an article included in Interspeech 2019. The authors use an unsupervised pre-trained convolutional neural network to improve a speech recognition task, and propose a two-class task of noise contrast learning, so that Wav2Vec can be trained on a large amount of unannotated data. For an introduction, refer to the website: https://zhuanlan.zhihu.com/p/302463174. Kaldi is an open-source speech recognition tool, and uses a weighted finite state transducer (WFST) to implement a decoding algorithm. The main code of Kaldi is written in C++. Based on this, some tools are made by using bash and python scripts. For an introduction, refer to the website: https://zhuanlan.zhihu.com/p/84050431.

In some embodiments, the ASR model may be obtained through re-training based on the sample audio (applicable to a case that a quantity of sample audio is large), or by fine-tuning a pre-trained ASR model based on the sample audio (applicable to a case that a quantity of sample audio is small).

For example, when the first accent is Mandarin, and the second accent is a dialect, the first ASR model is obtained through re-training based on the first sample audio, and the second ASR model is obtained by fine-tuning the first ASR model based on the second sample audio.

In this embodiment of this application, the ASR model obtained through training is configured for extracting a content feature from a speech. In some embodiments, the content feature is referred to as a bottleneck (BN) feature, and is usually a last-layer feature of the ASR model. The content feature of the speech is retained and other features such as a timbre and a tone are eliminated.

In some embodiments, a training process of the first ASR model includes: The computer device inputs the first sample audio into the first ASR model to perform text extraction, to obtain a first predicted text. The computer device calculates a loss function value between the first predicted text and a first sample text corresponding to the first sample audio. The computer device updates a model parameter of the first ASR model based on the loss function value between the first predicted text and the first sample text, to implement training of the first ASR model.

In some embodiments, a training process of the second ASR model includes: The computer device inputs the second sample audio into the second ASR model to perform text extraction, to obtain a second predicted text. The computer device calculates a loss function value between the second predicted text and a second sample text corresponding to the second sample audio. The computer device updates a model parameter of the second ASR model based on the loss function value between the second predicted text and the second sample text, to implement training of the second ASR model.

Operation 202: Train a first conversion model based on a first sample text and a first sample content feature that correspond to the first sample audio, the first sample content feature being extracted from the first sample audio by the first ASR model, and the first conversion model being configured for converting a text into a content feature of the first accent.

Because pronunciations are different when different accents are used to express the same text content, content features obtained by performing content feature extraction on speeches of different accents corresponding to the same text are also different. Correspondingly, the implementation of content feature conversion between different accents becomes a key to implementing accent conversion.

In this embodiment of this application, a data augmentation solution is used to implement content feature conversion between non-parallel corpora (that is, corpora corresponding to different accents and corresponding to different texts).

In some embodiments, the computer device performs feature extraction on the first sample audio through the trained first ASR model to obtain the first sample content feature of the first sample audio, to train the first conversion model based on the first sample text and the first sample content feature that correspond to the first sample audio. The first conversion model may be referred to as a text content feature conversion model (Text2BN model), and is configured for implementing conversion between a text and a source-accent content feature.

In some embodiments, a training process of the first conversion model includes: The computer device inputs the first sample text into the first conversion model to obtain a first predicted content feature. The computer device extracts the first sample content feature from the first sample audio through the first ASR model. The computer device calculates a loss function value between the first predicted content feature and the first sample content feature. The computer device updates a model parameter of the first conversion model based on the loss function value between the first predicted content feature and the first sample content feature, to implement training of the first conversion model.

Operation 203: Construct parallel sample data based on the first conversion model and a second sample text and a second sample content feature that correspond to the second sample audio, the second sample content feature being extracted from the second sample audio by the second ASR model, the parallel sample data including different content features, different content features being corresponding to different accents, and different content features being corresponding to a same text.

In some embodiments, the computer device performs text conversion on the second sample text corresponding to the second sample audio based on the first conversion model, to obtain a content feature of the first accent that corresponds to the second sample text. The computer device summarizes the content feature of the first accent that corresponds to the second sample text and a content feature of the second accent that corresponds to the second sample text to obtain the parallel sample data.

In some embodiments, the content feature of the second accent that corresponds to the second sample text is extracted by the second ASR model.

After the first conversion model is obtained through training, the computer device performs data augmentation based on the second sample text corresponding to the second sample audio and the first conversion model, to construct parallel sample data based on the second sample content feature and the content feature of the first accent that is obtained through the data augmentation. The parallel sample data includes a content feature of the first accent (generated by the first conversion model) and a content feature of the second accent (extracted by the second ASR model) that correspond to the same text.

For example, when dialect sample audio corresponding to a text A is included while Mandarin sample audio corresponding to the text A is not included, the computer device may construct, based on the first conversion model, the text A, and a dialect sample content feature of the dialect sample audio corresponding to the text A, parallel sample data corresponding to the text A. The parallel sample data includes Mandarin and dialect content features corresponding to the text A.

Operation 204: Train a second conversion model based on the parallel sample data, the second conversion model being configured for performing content feature conversion between the first accent and the second accent.

Further, the computer device trains the second conversion model based on the parallel sample data corresponding to the same text. The second conversion model may be referred to as a content feature conversion model (a BN2BN model), and is configured for converting a content feature of a source accent into a content feature of a target accent. The BN2BN model is configured for implementing an accent migration task. For an introduction, refer to the website: https://zhuanlan.zhihu.com/p/586037409.

For example, when the first accent is Mandarin, and the second accent is a dialect, the computer device trains the second conversion model for converting a content feature of Mandarin into a content feature of the dialect.

When the first sample audio and the second sample audio correspond to the same sample text, the sample content features corresponding to the first sample audio and the second sample audio may be directly used for training the second conversion model.

In some embodiments, a training process of the second conversion model includes: The computer device extracts the second sample content feature from the second sample audio through the second ASR model. The computer device converts the second sample text corresponding to the second sample audio through the first conversion model to obtain a third sample content feature, the third sample content feature being a content feature of audio generated by expressing the second sample text in the first accent. The computer device inputs the third sample content feature into the second conversion model to obtain a second predicted content feature. The computer device calculates a loss function value between the second predicted content feature and the second sample content feature. The computer device updates a model parameter of the second conversion model based on the loss function value between the second predicted content feature and the second sample content feature, to implement training of the second conversion model.

Operation 205: Train a third conversion model based on sample content features of different sample audio, the third conversion model being configured for converting a content feature into audio.

The third conversion model may be referred to as a content audio conversion model, and is configured for converting a content feature of a target speech into audio of the target speech.

In some embodiments, the third conversion model may include an acoustic model and a vocoder. The acoustic model is configured for generating an audio spectrum based on the content feature. The vocoder is configured for generating audio based on the audio spectrum.

In some embodiments, samples for training the third conversion model may be sample audio of various accents.

The third conversion model may be executed after training of the ASR model is completed, that is, the third conversion model may be trained synchronously with the first and second conversion models. A training sequence of the models is not limited in the embodiments of this application.

In some embodiments, a training process of the third conversion model includes: The computer device inputs the sample content features and speaker identifiers corresponding to the sample audio into the third conversion model to generate audio, to obtain predicted audio. The computer device calculates a loss function value between the predicted audio and the sample audio. The computer device updates a model parameter of the third conversion model based on the loss function value between the predicted audio and the sample audio, to implement training of the third conversion model.

Operation 206: Generate a speech conversion model based on the trained first ASR model, second conversion model, and third conversion model, the speech conversion model being configured for converting audio of the first accent into audio of the second accent.

After the first ASR model, the second conversion model, and the third conversion model are obtained through training through the foregoing operations, the computer device combines the foregoing models to obtain a final speech conversion model. A splicing order between the models is the first ASR model—the second conversion model—the third conversion model. That is, an output of the first ASR model is inputted into the second conversion model, and an output of the second conversion model is inputted into the third conversion model.

In an illustrative example, a trained speech conversion model for converting Mandarin into a dialect includes a Mandarin ASR model, a Mandarin-dialect content conversion model, and a content audio conversion model.

Based on the above, in this embodiment of this application, in a case of lack of a parallel corpus corresponding to a second sample audio of a second accent, a first conversion model configured for converting a text into a content feature is first trained based on first sample audio of a first accent. In this way, parallel sample data corresponding to the same text content but corresponding to different accents is constructed by using the first conversion model and a second sample text corresponding to the second sample audio. Then, a second conversion model for content feature conversion between different accents and a third conversion model configured for converting the content feature into audio are trained by using the parallel sample data, to complete training of a speech conversion model. During the model training, parallel corpora are constructed by using an intermediate model obtained through training, and there is no need to record parallel corpora of different accents before the model training. This can reduce a demand from model training for manually recorded parallel corpora while ensuring the quality of model training, thereby helping improve the efficiency of model training and improve the quality of model training in a case of insufficient samples.

An application process of the speech conversion model obtained through training by using the foregoing solution is described below. A speech conversion method can be implemented by using the speech conversion model. The speech conversion method is performed by a computer device. The speech conversion model includes a first ASR model, a second conversion model, and a third conversion model. During speech conversion, the computer device obtains first accent audio, the first accent audio being corresponding to a first accent. The computer device extracts a first content feature from the first accent audio through the first ASR model the first content feature being corresponding to the first accent. The computer device converts the first content feature into a second content feature through the second conversion model, the second content feature being corresponding to a second accent. The computer device performs audio conversion on the second content feature through the third conversion model to obtain second accent audio, to complete the speech conversion.

For example, after receiving the first accent audio of the first accent, the computer device performs content feature extraction through the first ASR model in the speech conversion model to obtain the first content feature.

In some embodiments, the computer device inputs the first content feature extracted by the first ASR model into the second conversion model, and the second conversion model performs content feature conversion between the first accent and the second accent to obtain the second content feature at the second accent.

The first content feature and the second content feature correspond to the same text (a text corresponding to the first accent audio).

In some embodiments, the second conversion model includes a convolutional layer and an N-layer stacked FFT. After performing convolution processing on the first content feature through the convolutional layer in the second conversion model, the computer device inputs a convolution result into the N-layer stacked FFT for conversion to obtain the second content feature.

In some embodiments, the computer device inputs the second content feature and a speaker identifier of a speaker corresponding to a target timbre into the third conversion model to obtain the second accent audio.

Different speakers correspond to different speaker identifiers.

In some embodiments, the third conversion model includes a third conversion sub-model and a vocoder. The third conversion sub-model is configured for converting a content feature into an audio spectrum feature. The vocoder is configured for generating audio based on the audio spectrum feature.

In some embodiments, the third conversion sub-model includes a convolutional layer and an N-layer stacked FFT. The audio spectrum feature may be a mel spectrogram feature, a mel-frequency cepstral coefficient (MFCC) feature, or the like. This is not limited in the embodiments of this application.

In some embodiments, the vocoder may be WaveNet or WaveRNN using autoregression, HiFi-GAN or MelGAN using non-autoregression, or the like. This is not limited in the embodiments of this application.

For ease of description, in the following embodiments, an example in which the audio spectrum feature is a mel spectrogram feature and the vocoder is HiFi-GAN is used for description, but this is not limited.

In some embodiments, the computer device inputs the second content feature and a speaker identifier into the third conversion sub-model to obtain an audio spectrum feature. The computer device inputs the audio spectrum feature into the vocoder to obtain the second accent audio.

Figure 3:
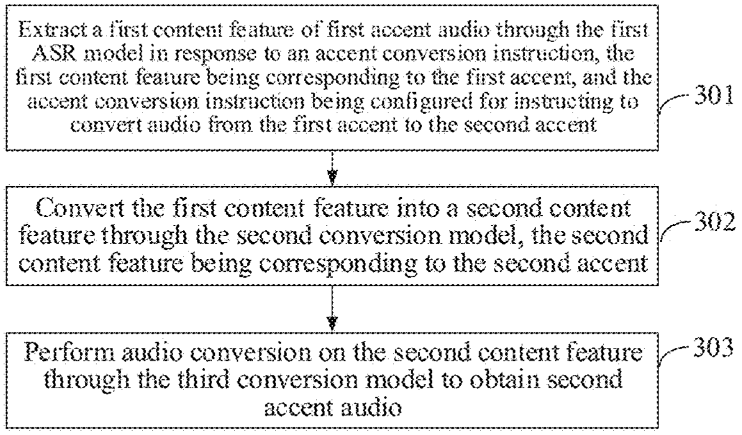
FIG. 3 is a flowchart of an accent conversion method according to an exemplary embodiment of this application.

An application process of the speech conversion model obtained through training by using the foregoing solution is described below. FIG. 3 is a flowchart of an accent conversion method according to an exemplary embodiment of this application. The method is performed by a computer device. The method includes the following operations.

Operation 301: Extract a first content feature of first accent audio through the first ASR model in response to an accent conversion instruction, the first content feature being corresponding to the first accent, and the accent conversion instruction being configured for instructing to convert audio from the first accent to the second accent.

Figure 4:
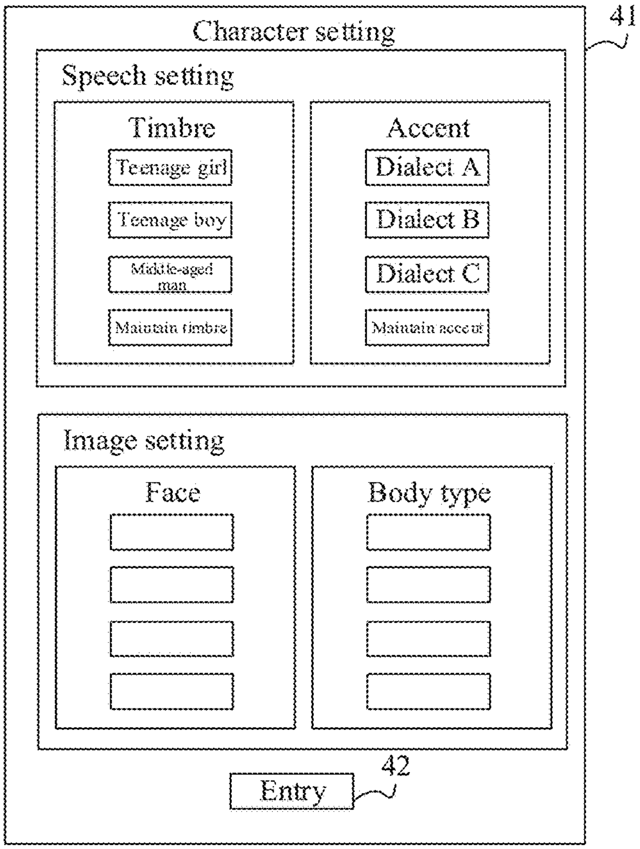
FIG. 4 is a schematic diagram of a speech setting interface according to an exemplary embodiment of this application.

In some embodiments, the accent conversion instruction is triggered after accent setting is completed. In a possible scenario, as shown in FIG. 4, in addition to a virtual character image setting option, a metaverse virtual character setting interface 41 also includes a speech setting option. A user may set a timbre and an accent of the virtual character through the speech setting option. After the speech and the image are set, the metaverse may be entered by triggering an entry button 42. After the entry button 42 is triggered, the computer device receives an accent conversion instruction. The accent conversion instruction includes accent identifiers of a source accent and a target accent. In this embodiment, descriptions are provided by using an example in which the source accent is the first accent and the target accent is the second accent.

After receiving the first accent audio of the first accent, the computer device performs content feature extraction through the first ASR model in the speech conversion model to obtain the first content feature. The first content feature provides interference such as a timbre and a tone, and only a feature at a level of expressed content is retained.

In some embodiments, the computer device uses a BN feature of a last layer of the first ASR model as the first content feature.

Figure 5:
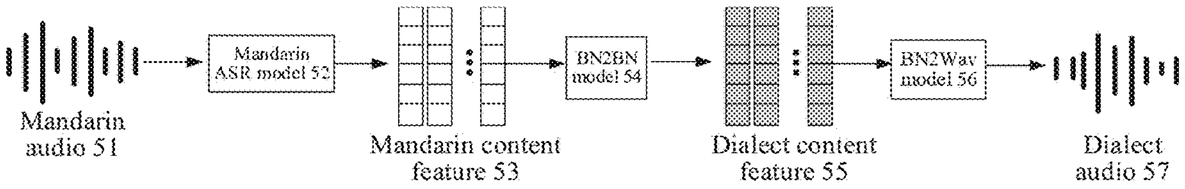
FIG. 5 is a schematic implementation diagram of an accent conversion process according to an exemplary embodiment of this application.

For example, as shown in FIG. 5, when conversion from Mandarin to a dialect is required, the computer device performs feature extraction on Mandarin audio 51 through a Mandarin ASR model 52 to obtain a Mandarin content feature 53.

Operation 302: Convert the first content feature into a second content feature through the second conversion model, the second content feature being corresponding to the second accent.

Further, the computer device inputs the first content feature extracted by the first ASR model into the second conversion model, and the second conversion model performs content feature conversion between the first accent and the second accent to obtain the second content feature at the second accent. The first content feature and the second content feature correspond to the same text (a text corresponding to the first accent audio).

For example, as shown in FIG. 5, a BN2BN model 54 is configured for content feature conversion between Mandarin and a dialect. After obtaining a Mandarin content feature 53, the computer device further performs feature conversion on the Mandarin content feature 53 through the BN2BN model 54 to obtain a dialect content feature 55.

Operation 303: Perform audio conversion on the second content feature through the third conversion model to obtain second accent audio.

Further, the computer device inputs the second content feature into the third conversion model, and the third conversion model generates the second accent audio based on the content feature.

For example, as shown in FIG. 5, the computer device inputs the dialect content feature 55 into a BN2Wav model 56 to obtain dialect audio 57 outputted by the BN2Wav model 56.

The first conversion model serves as a key model for constructing the parallel sample data. In a process of training the first conversion model, the computer device inputs the first sample text into the first conversion model to obtain a first predicted content feature outputted by the first conversion model, so that the first conversion model is trained by using the first sample content feature as supervision of the first predicted content feature.

In some embodiments, the computer device uses the first sample content feature as the supervision of the first predicted content feature, and determines a first conversion model loss based on a feature difference between the first predicted content feature and the first sample content feature, to train the first conversion model based on the first conversion model loss. The loss may be a mean square error (MSE) loss or another type of loss. This is not limited in this embodiment.

The MSE refers to an average of quadratic sums of feature difference values between the first predicted content feature and the first sample content feature, that is, an average of quadratic sums of errors.

In some embodiments, a loss $loss_{Text2BN}$ of the first conversion model may be expressed as:

$$loss_{Text2BN} = \|BN_{na} - \widehat{BN}_{na}\|$$

where $BN_{na}$ is the first sample content feature extracted by the first ASR model, and $\widehat{BN}_{na}$ is the first predicted content feature outputted by the first conversion model.

To improve the quality of conversion from a text to a content feature, in a possible design, the first conversion model includes a first conversion sub-model, a duration prediction sub-model, and a second conversion sub-model. The first conversion sub-model is configured for implementing conversion from a text to a text encoding feature. The duration prediction sub-model is configured for predicting expression duration of the text. The second conversion sub-model is configured for converting the text encoding feature into the content feature.

Figure 6:
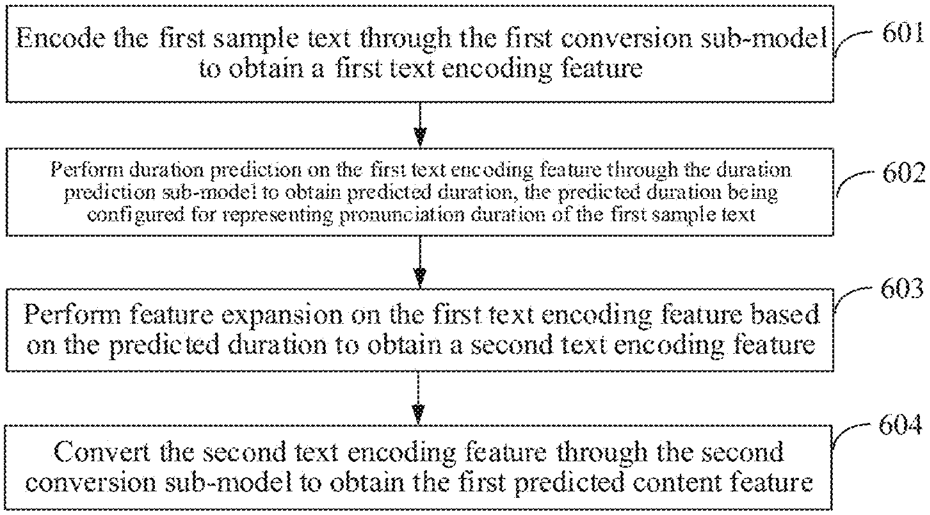
FIG. 6 is a flowchart of a text-to-content feature process according to an exemplary embodiment of this application.

Correspondingly, a process in which the first conversion model converts the text into the content feature is shown in FIG. 6.

Operation 601: Encode the first sample text through the first conversion sub-model to obtain a first text encoding feature.

Because text representations have a contextual correlation, in this embodiment of this application, to improve quality of subsequent feature conversion, in a possible design, an N-layer stacked FFT is used to form the first conversion sub-model. The FFT is configured for extracting deeper-level features by first mapping data into a space at a high latitude and then mapping the data into a space at a low latitude through linear transformation.

Figure 7:
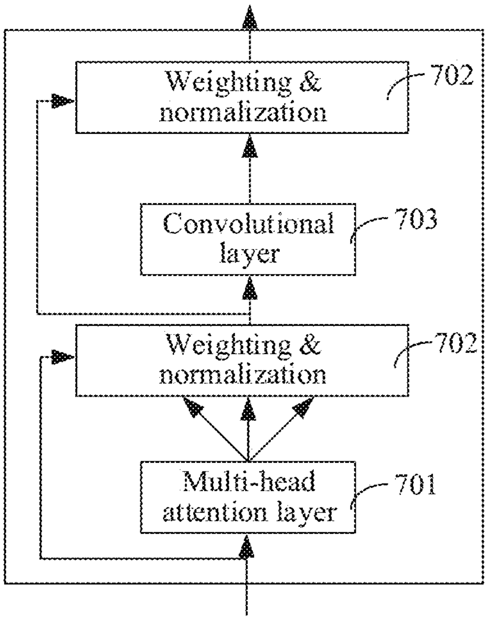
FIG. 7 is a structural diagram of a feed forward transformer (FFT) according to an exemplary embodiment of this application.

In addition, the FFT includes a multi-head attention mechanism layer and a convolutional layer. In an illustrative example, a structure of the FFT is shown in FIG. 7. An original input is first processed by a multi-head attention layer 701. A multi-channel result obtained through processing by the multi-head attention layer 701 and the original input are jointly processed by weighting and normalization 702, and then inputted into a convolutional layer 703 for convolution processing. After an input and an output of the convolutional layer 703 are added, the weighting and normalization 702 continue to be performed on a result of the adding, and the processed result is finally outputted.

Because the FFT is implemented through a multi-head attention mechanism and a convolutional layer, and a residual network idea is used, performing text encoding by using the first conversion sub-model obtained by stacking a plurality of layers of FFTs can improve text encoding quality.

Certainly, in addition to being implemented by using stacked FFTs, the first conversion sub-model may also be implemented by using another type of module (which needs to include an attention mechanism and keep input and output sizes consistent) such as a long short-term memory (LSTM). This is not limited in this embodiment of this application.

Operation 602: Perform duration prediction on the first text encoding feature through the duration prediction sub-model to obtain predicted duration, the predicted duration being configured for representing pronunciation duration of the first sample text.

When a text is expressed in a spoken language, there is specific expression duration. Therefore, to improve the authenticity of audio obtained through subsequent conversion (to make a speech obtained through conversion conform to a speaking speed of a real person), the computer device performs duration prediction through the duration prediction sub-model to obtain the pronunciation duration of the first sample text.

In some embodiments, the predicted duration includes pronunciation sub-duration corresponding to each sub-text in the first sample text. For example, if the first sample text is "Jin Tian Tian Qi Zhen Hao", the predicted duration includes pronunciation duration respectively corresponding to "Jin", "Tian", "Tian", "Qi", "Zhen", and "Hao".

Operation 603: Perform feature expansion on the first text encoding feature based on the predicted duration to obtain a second text encoding feature.

Further, the computer device performs feature expansion on the first text encoding feature based on the predicted duration, and copies a sub-feature in the first text encoding feature, so that duration corresponding to the copied sub-feature is consistent with pronunciation sub-duration of a corresponding sub-text.

In an illustrative example, the first text encoding feature is "abcd", and the second text encoding feature obtained after feature expansion is "aabbbcdddd".

Operation 604: Convert the second text encoding feature through the second conversion sub-model to obtain the first predicted content feature.

In some embodiments, feature sizes of the first predicted content feature outputted by the second conversion sub-model and the outputted second text encoding feature are maintained to be consistent.

In some embodiments, the second conversion sub-model includes an N-layer FFT, thereby improving the quality of conversion from the text encoding feature to the content feature.

Figure 8:
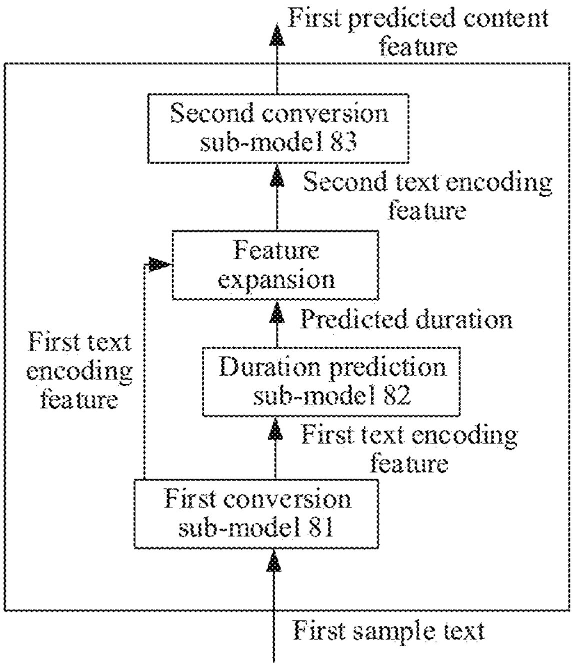
FIG. 8 is a schematic structural diagram of a first conversion model according to an exemplary embodiment of this application.

In an illustrative example, as shown in FIG. 8, a first conversion sub-model 81 first performs feature encoding on the first sample text to obtain a first text encoding feature, inputs the first text encoding feature into a duration prediction sub-model 82 to obtain predicted duration, and performs feature expansion processing on the first text encoding feature based on the predicted duration to obtain a second text encoding feature. Finally, feature conversion is performed on the second text encoding feature through a second conversion sub-model 83 to obtain a first predicted content feature.

Figure 9:
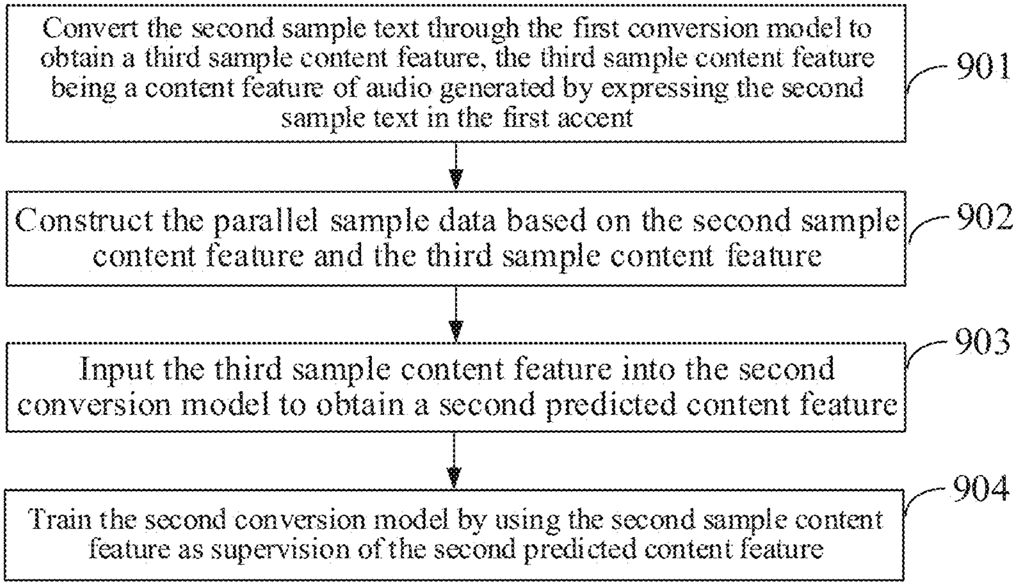
FIG. 9 is a flowchart of a training process of a second conversion model according to an exemplary embodiment of this application.

For the foregoing process of constructing the parallel sample data and training the second conversion model based on the parallel sample data, in a possible implementation, as shown in FIG. 9, the process may include the following operations.

Operation 901: Convert the second sample text through the first conversion model to obtain a third sample content feature, the third sample content feature being a content feature of audio generated by expressing the second sample text in the first accent.

When constructing the parallel sample data based on the second sample audio, the computer device performs content feature conversion on the second sample text corresponding to the second sample audio to obtain a third sample content feature. The first conversion model is configured for converting a text into a content feature of the first accent. Therefore, the third sample content feature obtained by performing content feature conversion on the second sample text by using the first conversion model is the content feature of the audio generated by expressing the second sample text in the first accent.

With the first conversion model, even if there is lack of parallel corpora corresponding to the second sample audio, content features of the parallel corpora can be generated, thereby eliminating a process of manually recording the parallel corpora and performing content feature extraction on the parallel corpora.

Operation 902: Construct the parallel sample data based on the second sample content feature and the third sample content feature.

Because the third sample content feature and the second sample content feature correspond to different accents and correspond to the same text, parallel sample data is constructed by combining the two.

Operation 903: Input the third sample content feature into the second conversion model to obtain a second predicted content feature.

In a possible design, to improve the quality of content feature conversion, the second conversion model includes a convolutional layer and an N-layer stacked FFT. For a specific structure of the FFT, refer to FIG. 7. Details are not described herein in this embodiment. During content feature conversion, the content feature first undergoes convolution processing by the convolutional layer and then is processed by the N-layer FFT to obtain the converted content feature.

Figure 10:
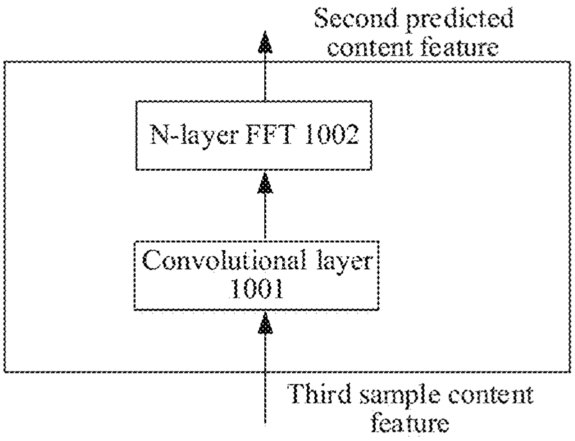
FIG. 10 is a schematic structural diagram of a second conversion model according to an exemplary embodiment of this application.

For example, as shown in FIG. 10, after performing convolution processing on the third sample content feature through a convolutional layer 1001, the computer device inputs a convolution result into an N-layer FFT 1002 to obtain a second predicted content feature.

Operation 904: Train the second conversion model by using the second sample content feature as supervision of the second predicted content feature.

To make a content conversion result of the second conversion model approximate to the second sample content feature of the second sample audio outputted by the second ASR model, in a possible implementation, the computer device determines a second conversion model loss based on a difference between the second sample content feature and the second predicted content feature, to train the second conversion model based on the second conversion model loss.

The loss may be an MSE loss or another type of loss. This is not limited in this embodiment.

In some embodiments, a loss $loss_{BN2BN}$ of the second conversion model may be expressed as:

$$loss_{BN2BN} = \|BN_{ac} - \widehat{BN}_{ac}\|$$

where $BN_{ac}$ is the second sample content feature extracted by the second ASR model, and $\widehat{BN}_{ac}$ is the second predicted content feature outputted by the second conversion model.

The content feature eliminates impact of factors such as a timbre, and the sample audio has a timbre feature. Therefore, in a process of training the third conversion model, a speaker identifier of the sample audio needs to be used as part of an input, so that the trained third conversion model can output audio with a specific timbre.

In a possible implementation, the computer device inputs the sample content feature and the speaker identifier corresponding to the sample audio into the third conversion model to obtain predicted audio, thereby training the third conversion model based on the predicted audio and the sample audio. The predicted audio and the sample audio correspond to the same audio content and have the same timbre.

In some embodiments, different speakers correspond to different speaker identifiers. In some embodiments, the speakers are grouped based on different timbres in advance, so that different speakers corresponding to the same timbre are assigned the same speaker identifier.

In a possible design, the third conversion model includes a third conversion sub-model and a vocoder. The third conversion sub-model is configured for converting the content feature into an audio spectrum feature. The vocoder is configured for generating audio based on the audio spectrum feature.

In some embodiments, the third conversion model includes a convolutional layer and an N-layer stacked FFT. The audio spectrum feature may be a mel spectrogram feature, an MFCC feature, or the like. This is not limited in the embodiments of this application.

In some embodiments, the vocoder may be WaveNet or WaveRNN using autoregression, HiFi-GAN or MelGAN using non-autoregression, or the like. This is not limited in the embodiments of this application.

For ease of description, in the following embodiments, an example in which the audio spectrum feature is a mel spectrogram feature and the vocoder is HiFi-GAN is used for description, but this is not limited.

Correspondingly, during training, the computer device inputs the sample content feature and the speaker identifier into the third conversion sub-model to obtain a predicted audio spectrum feature, and inputs the predicted audio spectrum feature into the vocoder to obtain the predicted audio.

Figure 11:
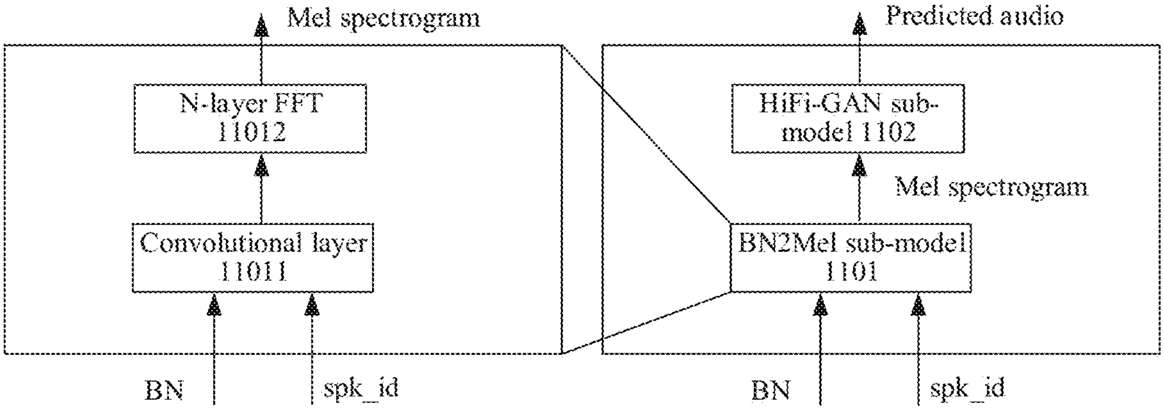
FIG. 11 is a schematic structural diagram of a third conversion model according to an exemplary embodiment of this application.

For example, as shown in FIG. 11, a BN2Wav model includes a BN2Mel sub-model 1101 and a HiFi-GAN sub-model 1102. The BN2Mel sub-model 1101 includes a convolutional layer 11011 and an N-layer stacked FFT 11012. During model training, the computer device inputs a sample content feature BN of the sample audio and a speaker identifier spk_id into the BN2Mel sub-model 1101. The BN2Mel sub-model 1101 inputs a mel spectrum obtained through conversion into the HiFi-GAN sub-model 1102, and the HiFi-GAN sub-model 1102 performs conversion to obtain predicted audio.

In a possible implementation, the computer device trains the third conversion sub-model and the vocoder jointly.

In another possible implementation, the computer device first trains the third conversion sub-model, and then trains the vocoder based on the trained third conversion sub-model, thereby improving training efficiency.

Figure 12:
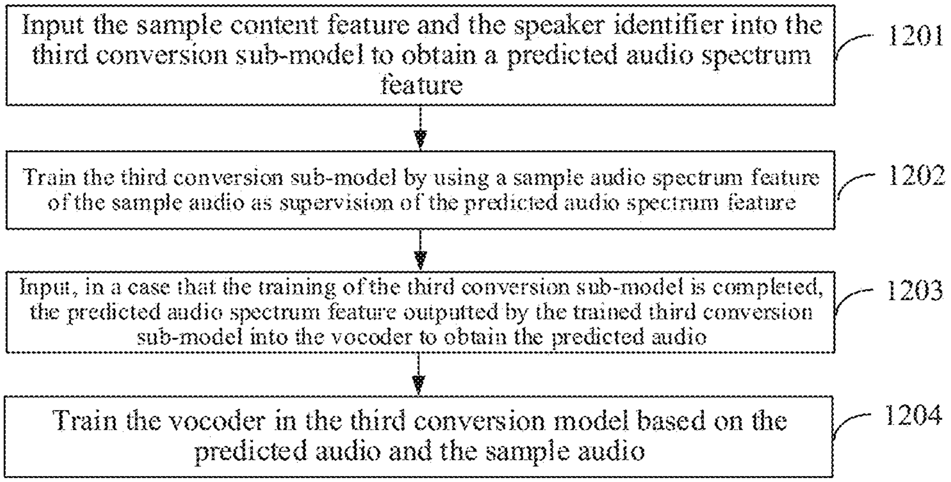
FIG. 12 is a flowchart of a training process of a third conversion model according to an exemplary embodiment of this application.

As shown in FIG. 12, a training process of the third conversion model may include the following operations.

Operation 1201: Input the sample content feature and the speaker identifier into the third conversion sub-model to obtain a predicted audio spectrum feature.

In a possible implementation, the computer device inputs the sample content feature and the speaker identifier into the third conversion sub-model to obtain a predicted mel spectrum corresponding to the sample audio.

Operation 1202: Train the third conversion sub-model by using a sample audio spectrum feature of the sample audio as supervision of the predicted audio spectrum feature.

In some embodiments, the computer device performs audio spectrum feature extraction on the sample audio to obtain a sample audio spectrum feature, thereby determining a third conversion sub-model loss based on a difference between the predicted audio spectrum feature and the sample audio spectrum feature, and thereby training the third conversion sub-model based on the third conversion sub-model loss.

The loss may be an MSE loss or another type of loss. This is not limited in this embodiment.

In some embodiments, a loss $loss_{BN2Mel}$ of the third conversion sub-model may be expressed as:

$$loss_{BN2Mel} = \|Mel - \hat{Mel}\|$$

where Mel is the sample audio spectrum feature obtained by directly performing audio spectrum feature extraction on the sample audio, and $\widehat{Mel}$ is the predicted audio spectrum feature outputted by the third conversion sub-model.

Operation 1203: Input, when the training of the third conversion sub-model is completed, the predicted audio spectrum feature outputted by the trained third conversion sub-model into the vocoder to obtain the predicted audio.

After the training of the third conversion sub-model is completed, the computer device inputs the sample content feature and the speaker identifier into the trained third conversion sub-model to obtain a predicted audio spectrum feature, and then inputs the predicted audio spectrum feature into the vocoder to obtain predicted audio outputted by the vocoder.

In an illustrative example, the computer device inputs a predicted mel spectrogram feature outputted by the trained BN2Mel sub-model into the HiFi-GAN to obtain predicted audio outputted by the HiFi-GAN.

Operation 1204: Train the vocoder in the third conversion model based on the predicted audio and the sample audio.

In some embodiments, the computer device uses the sample audio as supervision of the predicted audio, and determines a conversion loss of the vocoder, to train the vocoder based on the loss.

In some embodiments, when the vocoder uses an adversarial network, using HiFi-GAN as an example, the computer device uses an adversarial training idea, and adversarial training is performed through a generator and a discriminator. A loss of the generator in a process of the adversarial training may be expressed as:

$$L_G = L_G(G; D) + L_{FM}(G; D) + L_{mel}(G)$$

where $L_{mel}(G)=\|\varphi(x)-\varphi(G(s))\|$, $\varphi(G(s))$ is a mel spectrogram feature obtained by re-converting audio G(s) generated by the generator, $\varphi(x)$ is a mel spectrogram feature extracted from the sample audio, $L_{FM}(G; D)$ is a feature matching loss between the generated audio and the sample audio, and $L_G(G; D)$ is a discriminative loss of the generated audio.

A loss of the discriminator in the process of the adversarial training may be expressed as:

$$L_D(G; D) = (D(x) - 1)^2 + (D(G(s)))^2$$

where D(x) is a discrimination result of the discriminator for the sample audio, and D(G(s)) is a discrimination result of the discriminator for the predicted audio.

Apparently, through the third conversion model obtained through training in the foregoing manner, not only the content feature can be converted into audio, but also a specific timbre can be added to the audio obtained through conversion. Correspondingly, in an application process, in addition to selecting a target accent, a user may also select a target timbre.

In a possible implementation, when the accent conversion instruction includes the target timbre, the computer device inputs the second content feature and the speaker identifier of the speaker corresponding to the target timbre into the third conversion model to obtain second accent audio, the second accent audio having the second accent and the target timbre.

Figure 13:
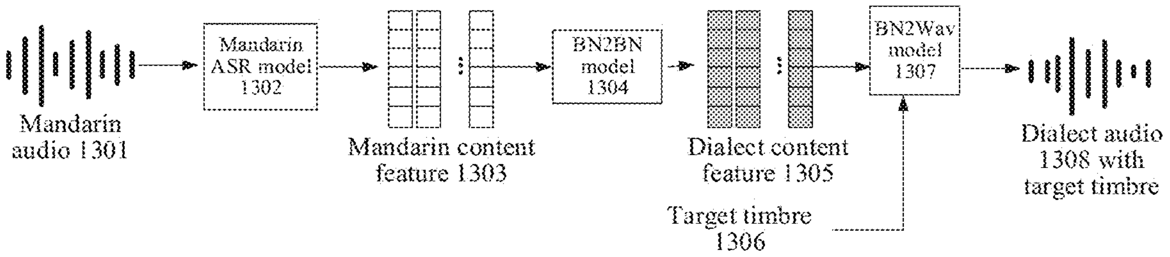
FIG. 13 is a schematic implementation diagram of an accent conversion process according to another exemplary embodiment of this application.

For example, as shown in FIG. 13, when conversion from Mandarin to a dialect is required, and a target timbre is required, the computer device performs feature extraction on Mandarin audio 1301 through a Mandarin ASR model 1302 to obtain a Mandarin content feature 1303. The computer device further performs feature conversion on the Mandarin content feature 1303 through a BN2BN model 1304 to obtain a dialect content feature 1305. The computer device inputs the dialect content feature 1305 and a speaker identifier corresponding to a target timbre 1306 into a BN2Wav model 1307 to obtain dialect audio 1308 with the target timbre that is outputted by the BN2Wav model 1307.

When the same timbre needs to be maintained before and after accent conversion, corpus data (for example, speech data with cumulative duration of 30 minutes) of a current user needs to be obtained in advance, and a speaker identifier is assigned to the current user, so that the third conversion model is trained based on the corpus data of the current user and the speaker identifier. Details are not described herein in this embodiment.

In this embodiment, in the process of training the third conversion model, in addition to using the content feature of the sample audio as an input, the speaker identifier corresponding to the sample audio is also used as an input, so that during the training of the third conversion model, audio conversion can be performed based on the content feature and a timbre feature of the speaker. During subsequent use, through inputting of different speaker identifiers, the third conversion model can output audio with different timbres for the same text content, thereby implementing both accent and timbre conversion.

Figure 14:
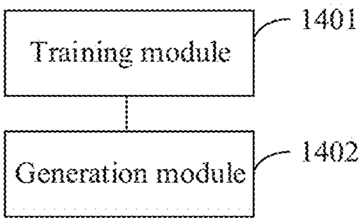
FIG. 14 is a structural block diagram of an apparatus for training a speech conversion model according to an exemplary embodiment of this application.

FIG. 14 is a structural block diagram of an apparatus for training a speech conversion model according to an exemplary embodiment of this application. The apparatus includes:

a training module 1401, configured to train a first ASR model based on first sample audio and train a second ASR model based on second sample audio, the first sample audio being corresponding to a first accent, and the second sample audio being corresponding to a second accent;

the training module 1401 being further configured to train a first conversion model based on a first sample text and a first sample content feature that correspond to the first sample audio, the first sample content feature being extracted from the first sample audio by the first ASR model, and the first conversion model being configured for converting a text into a content feature of the first accent;

the training module 1401 being further configured to construct parallel sample data based on the first conversion model and a second sample text and a second sample content feature that correspond to the second sample audio, the second sample content feature being extracted from the second sample audio by the second ASR model, the parallel sample data including different content features, different content features being corresponding to different accents, and different content features being corresponding to a same text; and train a second conversion model based on the parallel sample data, the second conversion model being configured for performing content feature conversion between the first accent and the second accent; and the training module 1401 being further configured to train a third conversion model based on sample content features of different sample audio, the third conversion model being configured for converting a content feature into audio; and a generation module 1402, configured to generate a speech conversion model based on the trained first ASR model, second conversion model, and third conversion model, the speech conversion model being configured for converting audio of the first accent into audio of the second accent.

In some embodiments, the training module 1401 is configured to:

convert the second sample text through the first conversion model to obtain a third sample content feature, the third sample content feature being a content feature of audio generated by expressing the second sample text in the first accent; and construct the parallel sample data based on the second sample content feature and the third sample content feature.

In some embodiments, the training module 1401 is configured to: input the third sample content feature into the second conversion model to obtain a second predicted content feature; and train the second conversion model by using the second sample content feature as supervision of the second predicted content feature.

In some embodiments, the training module 1401 is configured to: input the first sample text into the first conversion model to obtain a first predicted content feature outputted by the first conversion model; and train the first conversion model by using the first sample content feature as supervision of the first predicted content feature.

In some embodiments, the first conversion model includes a first conversion sub-model, a duration prediction sub-model, and a second conversion sub-model; and the training module 1401 is configured to:

encode the first sample text through the first conversion sub-model to obtain a first text encoding feature;

perform duration prediction on the first text encoding feature through the duration prediction sub-model to obtain predicted duration, the predicted duration being configured for representing pronunciation duration of the first sample text;

perform feature expansion on the first text encoding feature based on the predicted duration to obtain a second text encoding feature; and convert the second text encoding feature through the second conversion sub-model to obtain the first predicted content feature.

In some embodiments, the first conversion sub-model and the second conversion sub-model include an FFT, and the FFT includes a multi-head attention mechanism layer and a convolutional layer.

In some embodiments, the training module 1401 is configured to:

input the sample content feature and a speaker identifier corresponding to the sample audio into the third conversion model to obtain predicted audio, the predicted audio and the sample audio being corresponding to same audio content and having a same timbre, and different speakers being corresponding to different speaker identifiers; and train the third conversion model based on the predicted audio and the sample audio.

In some embodiments, the third conversion model includes a third conversion sub-model and a vocoder; and the training module 1401 is configured to:

input the sample content feature and the speaker identifier into the third conversion sub-model to obtain a predicted audio spectrum feature; and input the predicted audio spectrum feature into the vocoder to obtain the predicted audio.

In some embodiments, the training module 1401 is configured to:

train the third conversion sub-model by using a sample audio spectrum feature of the sample audio as supervision of the predicted audio spectrum feature;

input, when the training of the third conversion sub-model is completed, the predicted audio spectrum feature outputted by the trained third conversion sub-model into the vocoder to obtain the predicted audio; and train the vocoder in the third conversion model based on the predicted audio and the sample audio.

In some embodiments, the apparatus further includes:

a conversion module, configured to extract a first content feature of first accent audio through the first ASR model in response to an accent conversion instruction, the first content feature being corresponding to the first accent, and the accent conversion instruction being configured for instructing to convert audio from the first accent to the second accent;

convert the first content feature into a second content feature through the second conversion model, the second content feature being corresponding to the second accent; and perform audio conversion on the second content feature through the third conversion model to obtain second accent audio.

In some embodiments, the accent conversion instruction includes a target timbre; and the conversion module is configured to:

input the second content feature and a speaker identifier of a speaker corresponding to the target timbre into the third conversion model to obtain the second accent audio, different speakers being corresponding to different speaker identifiers.

Based on the above, in this embodiment of this application, in a case of lack of a parallel corpus corresponding to a second sample audio of a second accent, a first conversion model configured for converting a text into a content feature is first trained based on first sample audio of a first accent. In this way, parallel sample data corresponding to the same text content but corresponding to different accents is constructed by using the first conversion model and a second sample text corresponding to the second sample audio. Then, a second conversion model for content feature conversion between different accents and a third conversion model configured for converting the content feature into audio are trained by using the parallel sample data, to complete training of a speech conversion model. During the model training, parallel corpora are constructed by using an intermediate model obtained through training, and there is no need to record parallel corpora of different accents before the model training. This can reduce a demand from model training for manually recorded parallel corpora while ensuring the quality of model training, thereby helping improve the efficiency of model training and improve the quality of model training in a case of insufficient samples.

The apparatus provided in the foregoing embodiment is illustrated only with an example of division of the foregoing function modules. In practical applications, the foregoing functions may be allocated to and completed by different function modules according to requirements. That is, the internal structure of the apparatus is divided into different function modules to complete all or some of the functions described above. In addition, the apparatus provided in the foregoing embodiment is based on the same concept as the method embodiment. For details of an implementation process of the apparatus, refer to the method embodiment. The details are not described herein again.

Figure 15:
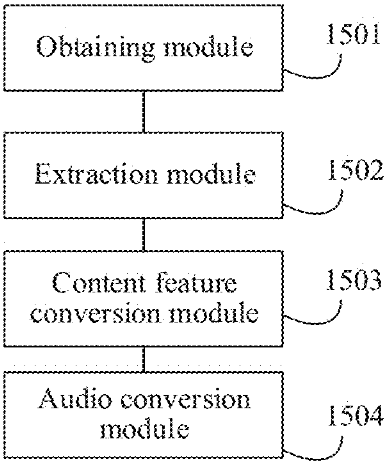
FIG. 15 is a structural block diagram of a speech conversion apparatus according to an exemplary embodiment of this application.

FIG. 15 is a structural block diagram of a speech conversion apparatus according to an exemplary embodiment of this application. The apparatus includes:

an obtaining module 1501, configured to obtain first accent audio, the first accent audio being corresponding to a first accent;

an extraction module 1502, configured to extract the first accent audio through a first ASR model to obtain a first content feature, the first content feature being corresponding to the first accent;

a content feature conversion module 1503, configured to convert the first content feature into a second content feature through a second conversion model, the second content feature being corresponding to a second accent; and an audio conversion module 1504, configured to perform audio conversion on the second content feature through a third conversion model to obtain second accent audio.

In some embodiments, the content feature conversion module 1503 is further configured to input the first content feature extracted by the first ASR model into the second conversion model, and perform content feature conversion between the first accent and the second accent through the second conversion model to obtain the second content feature at the second accent.

In some embodiments, the second conversion model includes a convolutional layer and an N-layer stacked FFT.

In some embodiments, the content feature conversion module 1503 is further configured to perform convolution processing on the first content feature through the convolutional layer in the second conversion model, and input a convolution result into the N-layer stacked FFT for conversion to obtain the second content feature.

In some embodiments, the third conversion model includes a third conversion sub-model and a vocoder, the third conversion sub-model being configured for converting a content feature into an audio spectrum feature, and the vocoder being configured to generate audio based on the audio spectrum feature.

In some embodiments, the audio conversion module 1504 is further configured to input the second content feature and a speaker identifier into the third conversion sub-model to obtain an audio spectrum feature.

In some embodiments, the audio conversion module 1504 is further configured to input the audio spectrum feature into the vocoder to obtain the second accent audio.

In some embodiments, the third conversion sub-model includes a convolutional layer and an N-layer stacked FFT.

Figure 16:
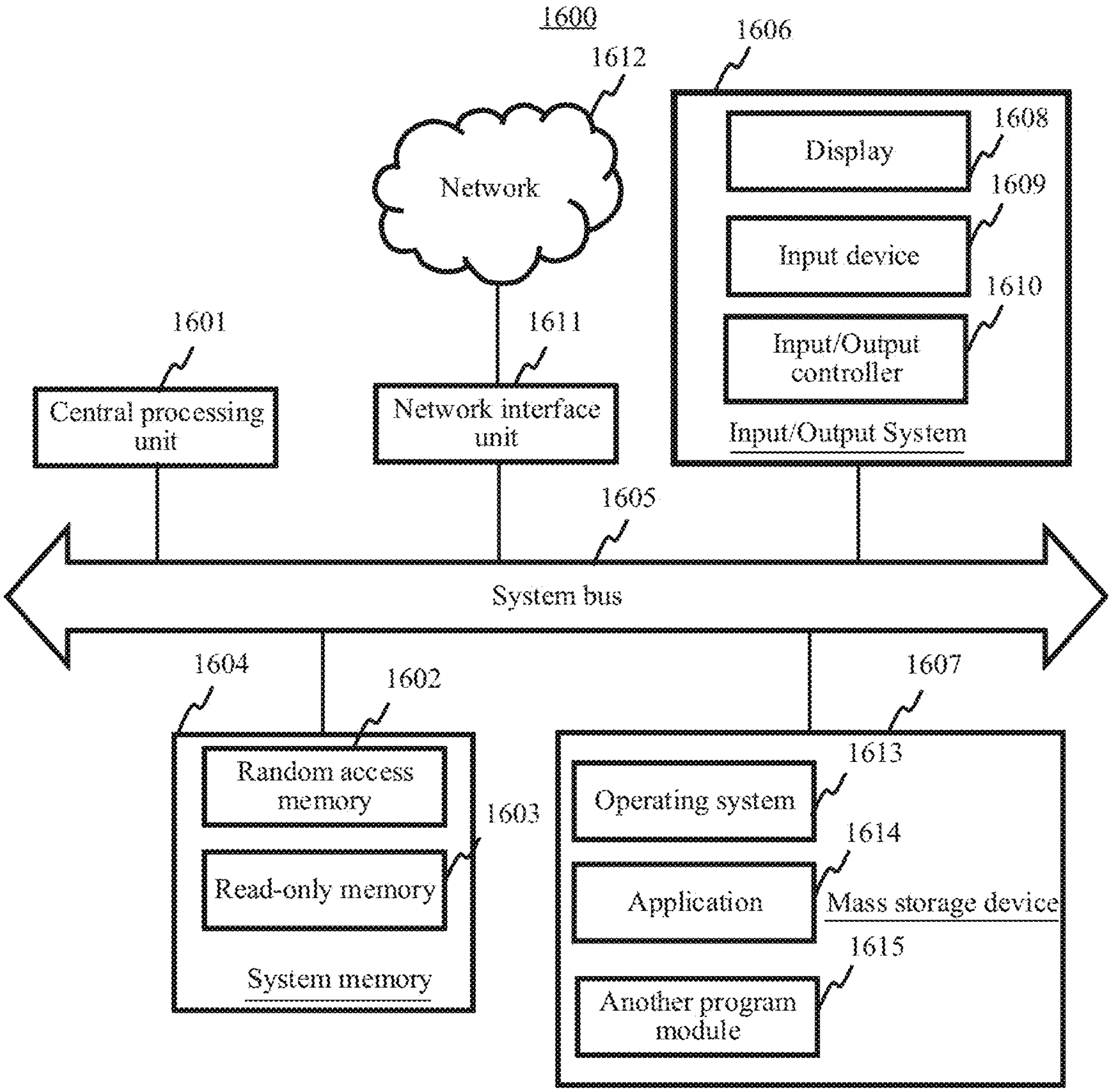
FIG. 16 is a schematic structural diagram of a computer device according to an exemplary embodiment of this application.

FIG. 16 is a schematic structural diagram of a computer device according to an exemplary embodiment of this application. The computer device may be a screen projection device or a terminal in the foregoing embodiment. Specifically: the computer device 1600 includes a central processing unit (CPU) 1601, a system memory 1604 including a random access memory (RAM) 1602 and a read-only memory (ROM) 1603, and a system bus 1605 connecting the system memory 1604 and the CPU 1601. The computer device 1600 further includes a basic input/output (I/O) system 1606 assisting in information transmission between components in the computer, and a mass storage device 1607 configured to store an operating system 1613, an application program 1614, and another program module 1615.

The basic I/O system 1606 includes a display 1608 configured to display information and an input device 1609 such as a mouse or a keyboard that is used for inputting information by a user. The display 1608 and the input device 1609 are both connected to the CPU 1601 through an I/O controller 1610 connected to the system bus 1605. The basic I/O system 1606 may further include the I/O controller 1610 to be configured to receive and process inputs from a plurality of other devices such as a keyboard, a mouse, and an electronic stylus. Similarly, the I/O controller 1610 further provides an output to a display screen, a printer, or another type of output device.

The mass storage device 1607 is connected to the CPU 1601 by using a mass storage controller (not shown) connected to the system bus 1605. The mass storage device 1607 and a computer-readable medium associated therewith provide non-volatile storage to the computer device 1600. In other words, the mass storage device 1607 may include a computer-readable medium (not shown) such as a hard disk or a drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, a flash memory or another solid-state storage technology, a compact disc ROM (CD-ROM), a digital versatile disc (DVD) or another optical memory, a magnetic cassette, a magnetic tape, a magnetic disk memory, or another magnetic storage device. Certainly, a person skilled in the art may learn that the computer storage medium is not limited to the foregoing several types. The system memory 1604 and the mass storage device 1607 may be collectively referred to as a memory.

The memory stores one or more programs. The one or more programs are configured for being executed by one or more CPUs 1601. The one or more programs include instructions configured for implementing the foregoing methods. The CPU 1601 executes the one or more programs to implement the methods provided in the foregoing method embodiments.

According to the embodiments of this application, the computer device 1600 may further be connected, through a network such as the Internet, to a remote computer on the network and run. That is, the computer device 1600 may be connected to a network 1612 by using a network interface unit 1611 connected to the system bus 1605, or may be connected to another type of network or a remote computer system (not shown) by using a network interface unit 1611.

An embodiment of this application further provides a non-transitory computer-readable storage medium, the readable storage medium storing at least one instruction, the at least one instruction being loaded and executed by a processor to implement the method for training a speech conversion model described in the foregoing embodiment or the speech conversion method described in the foregoing embodiment.

In some embodiments, the computer-readable storage medium may include: a ROM, a RAM, a solid state drive (SSD), an optical disc, or the like. The RAM may include a resistance RAM (ReRAM) and a dynamic RAM (DRAM).

The term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. An embodiment of this application provides a computer program product or a computer program. The computer program product or the computer program includes computer instructions. The computer instructions are stored in a computer-readable storage medium. A processor of a computer device reads the computer instructions from the computer-readable storage medium, and the processor executes the computer instructions, to cause the computer device to perform the method for training a speech conversion model described in the foregoing embodiment or the speech conversion method described in the foregoing embodiment.

What is claimed is:

1. A speech conversion method performed by a computer device, the computer device having a speech conversion model provided therein, the speech conversion model comprising a first automatic speech recognition (ASR) model, a second conversion model, and a third conversion model, the method comprising:

obtaining first accent audio corresponding to a first accent;

extracting a first content feature from the first accent audio through the first ASR model, the first content feature being a bottleneck feature of a last layer of the first ASR model and corresponding to the first accent;

converting the first content feature into a second content feature through the second conversion model, the second content feature being corresponding to a second accent; and performing audio conversion on the second content feature through the third conversion model to obtain second accent audio.

2. The method according to claim 1, wherein the speech conversion model is trained by:

training the first automatic speech recognition (ASR) model based on first sample audio and training a second ASR model based on second sample audio, the first sample audio being corresponding to a first accent, and the second sample audio being corresponding to a second accent;

training the first conversion model based on a first sample text and a first sample content feature that correspond to the first sample audio, the first sample content feature being extracted from the first sample audio by the first ASR model, and the first conversion model being configured for converting a text into a content feature of the first accent;

constructing parallel sample data based on the first conversion model and a second sample text and a second sample content feature that correspond to the second sample audio, the second sample content feature being extracting from the second sample audio by the second ASR model, the parallel sample data comprising different content features, different content features being corresponding to different accents, and different content features being corresponding to a same text;

training the second conversion model based on the parallel sample data, the second conversion model being configured for performing content feature conversion between the first accent and the second accent;

training the third conversion model based on sample content features of different sample audio, the third conversion model being configured for converting a content feature into audio; and generating the speech conversion model based on the trained first ASR model, second conversion model, and third conversion model, the speech conversion model being configured for converting audio of the first accent into audio of the second accent.

3. The method according to claim 2, wherein the constructing parallel sample data based on the first conversion model and a second sample text and a second sample content feature that correspond to the second sample audio comprises:

converting the second sample text through the first conversion model to obtain a third sample content feature, the third sample content feature being a content feature of audio generated by expressing the second sample text in the first accent; and constructing the parallel sample data based on the second sample content feature and the third sample content feature.

4. The method according to claim 3, wherein the training the second conversion model based on the parallel sample data comprises:

inputting the third sample content feature into the second conversion model to obtain a second predicted content feature; and training the second conversion model by using the second sample content feature as supervision of the second predicted content feature.

5. The method according to claim 2, wherein the training the first conversion model based on a first sample text and a first sample content feature that correspond to the first sample audio comprises:

inputting the first sample text into the first conversion model to obtain a first predicted content feature outputted by the first conversion model; and training the first conversion model by using the first sample content feature as supervision of the first predicted content feature.

6. The method according to claim 2, wherein the training the third conversion model based on sample content features of different sample audio comprises:

inputting the sample content feature and a speaker identifier corresponding to the sample audio into the third conversion model to obtain predicted audio, the predicted audio and the sample audio being corresponding to same audio content and having a same timbre, and different speakers being corresponding to different speaker identifiers; and training the third conversion model based on the predicted audio and the sample audio.

7. The method according to claim 1, wherein the accent conversion instruction comprises a target timbre; and the performing audio conversion on the second content feature through the third conversion model to obtain second accent audio comprises:

inputting the second content feature and a speaker identifier of a speaker corresponding to the target timbre into the third conversion model to obtain the second accent audio, different speakers being corresponding to different speaker identifiers.

8. The method according to claim 1, wherein the bottleneck feature of the last layer of the first ASR model retains only the first content feature from the first accent audio while eliminating other features from the first accent audio, the other features including a timber and a tone of the first accent audio.

9. A computer device, comprising a processor and a memory, the memory storing at least one instruction, the at least one instruction, when loaded and executed by the processor, causing the computer device to implement a speech conversion method including:

obtaining first accent audio corresponding to a first accent;

extracting a first content feature from the first accent audio through the first ASR model, the first content feature being a bottleneck feature of a last layer of the first ASR model and corresponding to the first accent;

converting the first content feature into a second content feature through the second conversion model, the second content feature being corresponding to a second accent; and performing audio conversion on the second content feature through the third conversion model to obtain second accent audio.

10. The computer device according to claim 9, wherein the speech conversion model is trained by:

training the first automatic speech recognition (ASR) model based on first sample audio and training a second ASR model based on second sample audio, the first sample audio being corresponding to a first accent, and the second sample audio being corresponding to a second accent;

training the first conversion model based on a first sample text and a first sample content feature that correspond to the first sample audio, the first sample content feature being extracted from the first sample audio by the first ASR model, and the first conversion model being configured for converting a text into a content feature of the first accent;

constructing parallel sample data based on the first conversion model and a second sample text and a second sample content feature that correspond to the second sample audio, the second sample content feature being extracting from the second sample audio by the second ASR model, the parallel sample data comprising different content features, different content features being corresponding to different accents, and different content features being corresponding to a same text;

training the second conversion model based on the parallel sample data, the second conversion model being configured for performing content feature conversion between the first accent and the second accent;

training the third conversion model based on sample content features of different sample audio, the third conversion model being configured for converting a content feature into audio; and generating the speech conversion model based on the trained first ASR model, second conversion model, and third conversion model, the speech conversion model being configured for converting audio of the first accent into audio of the second accent.

11. The computer device according to claim 10, wherein the constructing parallel sample data based on the first conversion model and a second sample text and a second sample content feature that correspond to the second sample audio comprises:

converting the second sample text through the first conversion model to obtain a third sample content feature, the third sample content feature being a content feature of audio generated by expressing the second sample text in the first accent; and constructing the parallel sample data based on the second sample content feature and the third sample content feature.

12. The computer device according to claim 11, wherein the training the second conversion model based on the parallel sample data comprises:

inputting the third sample content feature into the second conversion model to obtain a second predicted content feature; and training the second conversion model by using the second sample content feature as supervision of the second predicted content feature.

13. The computer device according to claim 10, wherein the training the first conversion model based on a first sample text and a first sample content feature that correspond to the first sample audio comprises:

inputting the first sample text into the first conversion model to obtain a first predicted content feature outputted by the first conversion model; and training the first conversion model by using the first sample content feature as supervision of the first predicted content feature.

14. The computer device according to claim 10, wherein the training the third conversion model based on sample content features of different sample audio comprises:

inputting the sample content feature and a speaker identifier corresponding to the sample audio into the third conversion model to obtain predicted audio, the predicted audio and the sample audio being corresponding to same audio content and having a same timbre, and different speakers being corresponding to different speaker identifiers; and training the third conversion model based on the predicted audio and the sample audio.

15. The computer device according to claim 9, wherein the accent conversion instruction comprises a target timbre; and the performing audio conversion on the second content feature through the third conversion model to obtain second accent audio comprises:

inputting the second content feature and a speaker identifier of a speaker corresponding to the target timbre into the third conversion model to obtain the second accent audio, different speakers being corresponding to different speaker identifiers.

16. A non-transitory computer-readable storage medium, storing at least one instruction therein, the at least one instruction, when loaded and executed by a processor of a computer device, causing the computer device to implement a speech conversion method including:

obtaining first accent audio corresponding to a first accent;

extracting a first content feature from the first accent audio through the first ASR model, the first content feature being a bottleneck feature of a last layer of the first ASR model and corresponding to the first accent;

converting the first content feature into a second content feature through the second conversion model, the second content feature being corresponding to a second accent; and performing audio conversion on the second content feature through the third conversion model to obtain second accent audio.

17. The non-transitory computer-readable storage medium according to claim 16, wherein the speech conversion model is trained by:

training the first automatic speech recognition (ASR) model based on first sample audio and training a second ASR model based on second sample audio, the first sample audio being corresponding to a first accent, and the second sample audio being corresponding to a second accent;

training the first conversion model based on a first sample text and a first sample content feature that correspond to the first sample audio, the first sample content feature being extracted from the first sample audio by the first ASR model, and the first conversion model being configured for converting a text into a content feature of the first accent;

constructing parallel sample data based on the first conversion model and a second sample text and a second sample content feature that correspond to the second sample audio, the second sample content feature being extracting from the second sample audio by the second ASR model, the parallel sample data comprising different content features, different content features being corresponding to different accents, and different content features being corresponding to a same text;

training the second conversion model based on the parallel sample data, the second conversion model being configured for performing content feature conversion between the first accent and the second accent;

training the third conversion model based on sample content features of different sample audio, the third conversion model being configured for converting a content feature into audio; and generating the speech conversion model based on the trained first ASR model, second conversion model, and third conversion model, the speech conversion model being configured for converting audio of the first accent into audio of the second accent.

18. The non-transitory computer-readable storage medium according to claim 17, wherein the constructing parallel sample data based on the first conversion model and a second sample text and a second sample content feature that correspond to the second sample audio comprises:

converting the second sample text through the first conversion model to obtain a third sample content feature, the third sample content feature being a content feature of audio generated by expressing the second sample text in the first accent; and constructing the parallel sample data based on the second sample content feature and the third sample content feature.

19. The non-transitory computer-readable storage medium according to claim 17, wherein the training the first conversion model based on a first sample text and a first sample content feature that correspond to the first sample audio comprises:

inputting the first sample text into the first conversion model to obtain a first predicted content feature outputted by the first conversion model; and training the first conversion model by using the first sample content feature as supervision of the first predicted content feature.

20. The non-transitory computer-readable storage medium according to claim 16, wherein the accent conversion instruction comprises a target timbre; and the performing audio conversion on the second content feature through the third conversion model to obtain second accent audio comprises:

inputting the second content feature and a speaker identifier of a speaker corresponding to the target timbre into the third conversion model to obtain the second accent audio, different speakers being corresponding to different speaker identifiers.

* * * * *